(12) United States Patent
Iwazaki et al.

(10) Patent No.: US 7,002,444 B2
(45) Date of Patent: Feb. 21, 2006

(54) ELECTROMAGNETIC COIL ASSEMBLY AND ELECTROMAGNETIC ACTUATOR

(75) Inventors: Akihiro Iwazaki, Saitama (JP); Rikiya Kunii, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 39 days.

(21) Appl. No.: 10/810,584

(22) Filed: Mar. 29, 2004

(65) Prior Publication Data

US 2004/0212473 A1 Oct. 28, 2004

(30) Foreign Application Priority Data

Apr. 24, 2003 (JP) .............................. 2003-119538

(51) Int. Cl.
*H01F 27/02* (2006.01)

(52) U.S. Cl. .......................................... 336/96; 335/251
(58) Field of Classification Search ............ 336/90–96; 335/251, 261; 251/129.15–129.22
See application file for complete search history.

(56) References Cited

U.S. PATENT DOCUMENTS

| 3,245,651 | A | * | 4/1966 | Erickson ................ 251/129.17 |
| 3,348,178 | A | * | 10/1967 | Erickson et al. ............ 335/251 |
| 5,560,549 | A | * | 10/1996 | Ricco et al. ............. 239/533.8 |
| 6,138,809 | A | * | 10/2000 | Kinoshita et al. ...... 192/84.961 |
| 6,612,544 | B1 | * | 9/2003 | Sakata et al. .......... 251/129.15 |

FOREIGN PATENT DOCUMENTS

| JP | 5-109571 | 4/1993 |
| JP | 8-316082 | 11/1996 |
| JP | 9-55328 | 2/1997 |
| JP | 2966162 | 8/1999 |
| JP | 2001-76927 | 3/2001 |
| JP | 2002-57025 | 2/2002 |

\* cited by examiner

*Primary Examiner*—Tuyen T Nguyen
(74) *Attorney, Agent, or Firm*—Westerman, Hattori, Daniels, Adrian, LLP

(57) ABSTRACT

An electromagnetic coil assembly has a main coil having a first end and a second end, the main coil being wound without a bobbin, a first cover fitted over the main coil from the first end of the main coil, a second cover fitted over the main coil from the second end of the main coil and a molding resin covering the first and second covers.

14 Claims, 9 Drawing Sheets

ELECTROMAGNETIC COIL ASSEMBLY AND ELECTROMAGNETIC ACTUATOR

BACKGROUND OF THE INVENTION

1. Field of the Invention

The present invention relates to an electromagnetic coil assembly and an electromagnetic actuator which are used in a torque transfer mechanism for an electronically controlled four-wheel drive vehicle.

2. Description of the Related Art

For example, a torque transfer mechanism for a four-wheel drive vehicle includes a pair of left and right planetary gear sets and a pair of brake mechanisms for variably controlling the torque of a sun gear connecting to the respective planetary gear sets. Each brake mechanism includes a wet multi-plate brake and an electromagnetic actuator for actuating the multi-plate brake mechanism.

The electromagnetic actuator includes, in turn, a core (a yoke) having an annular groove, an electromagnetic coil inserted into the annular groove in the core, and armature disposed in such a manner as to face the core with a predetermined gap being provided therebetween, and a piston coupled to the armature.

When a current is applied to the electromagnetic coil, the armature is drawn towards the core by the solenoid to thereby generate a thrust. The piston integrally coupled to the armature presses against the multi-plate brake by virtue of the thrust so generated, whereby a brake torque is generated.

An output torque that is transferred to left and right rear axles can be variably controlled by controlling the value of a current conducted to left and right electromagnetic coils based on a turning direction and a steering force or a steering angle.

An electromagnetic coil is in general use as a conventional electromagnetic coil in which a wire is directly wound around a bobbin formed from a resin material. This electromagnetic coil is inserted into an annular groove in a yoke formed from a magnetic material, and thereafter, a potting material is infected thereover so that the electromagnetic coil is fixed to the yoke.

[Related Art]
1. JP-A-5-109571
2. JP-A-8-316082
3. JP-A-9-55328
4. JP-A-2001-76927
5. JP-A-2002-57025
6. JP-B-2966162

In the electromagnetic coil in which the wire is wound around the bobbin, a tension load resulting when the wire is wound around the bobbin remains. In addition, when the temperature environment of the electromagnetic coil becomes severe, a stress is generated due to coefficients of linear expansion relative to change in temperature of the yoke formed from the magnetic material, and the resin material constituting the bobbin of the electromagnetic coil and the potting material being different.

There is a problem that the stress attributed to the coefficients combined with the remaining tension results in breakage of the bobbin formed from the resin material or breakage of the wire. In particular, in a case where the electromagnetic actuator has a search coil for detecting the magnetic field of the electromagnetic coil, since the wire of the search coil is thin, the wire is easy to be broken.

SUMMARY OF THE INVENTION

Consequently, an object of the invention is to provide an electromagnetic coil assembly which experiences no breakage of a coil thereof even if there occurs a large change in temperature.

Another object of the invention is to provide an electromagnetic actuator which experiences no breakage of an electromagnetic coil thereof and, hence, which is highly reliable.

According to a first aspect of the invention, there is provided an electromagnetic coil assembly including a main coil having a first end and a second end, the main coil being wound without a bobbin, a first cover fitted over the main coil from the first end of the main coil, a second cover fitted over the main coil from the second end of the main coil and a molding resin covering the first and second covers.

According to the electromagnetic coil assembly of the first aspect of the invention, since the main coil is such that the wire is wound without a bobbin, in no case a tension load that results when the wire is wound remains in the main coil. Consequently, it is possible to provide the electromagnetic coil assembly that is difficult to be affected by a stress caused by a change in temperature.

According to a second aspect of the present invention, there is provided an electromagnetic actuator including a circular core having an annular groove an electromagnetic coil assembly mounted in the annular groove and a circular armature disposed so as to be oppose to the circular core with a gap being provided therebetween, wherein the electromagnetic coil assembly has a main coil having a first end and a second end, the main coil being wound without a bobbin a first cover fitted over the main coil from the first end of the main coil, a second cover fitted over the main coil from the second end of the main coil and a molding resin covering the first and second covers.

According to the electromagnetic actuator of the second aspect of the present invention, the electromagnetic coil assembly having the main moil is mounted in the annular groove in the circular core. Consequently, in no case a tension load resulting when the wire is wound remains in the main coil, and therefore, it is possible to provide the electromagnetic actuator which is difficult to be affected by a stress generated by a change in temperature and, hence, which is highly reliable.

According to a third aspect of the present invention as set forth in the second aspect of the present invention, there is provided an electromagnetic actuator wherein the electromagnetic coil assembly further has a search coil embedded in the molding resin.

According to the construction, a magnetic field that is generated by the main coil can be detected by the search coil, and the value of a current that is conducted through the main coil can be controlled based on the magnetic field so detected.

According to a fourth and fifth aspects of the present invention as set forth in the second and third aspects of the present invention, the electromagnetic coil assembly is mounted in the annular groove with a clearance in a radial direction. Consequently, even if the coefficients of linear expansion of the electromagnetic coil assembly, and the core and the armature are different, mutual interferences resulting in conjunction with a change in temperature can be avoided, and, hence, a construction can be realized in which the electromagnetic coil assembly is free from stress.

According to a sixth through eighth aspects of the present invention as set forth in the second, third and fourth aspects of the present invention, there is provided an electromagnetic actuator further including a biasing unit for biasing the electromagnetic coil assembly in an axial direction and a clip for preventing the electromagnetic coil assembly from being dislocated the annular groove.

According to the construction, the electromagnetic coil assembly can be securely locked within the annular groove with a certain magnitude of elastic force being provided.

According to a ninth through twelfth aspects of the present invention as set forth in the second though fifth aspects of the present invention, the molding resin has a plurality of projections spaced away from each other in a circumferential direction. In addition, the electromagnetic coil assembly is inserted into the annular groove in such a manner that the projections are brought into abutment with sidewall constituting the annular groove.

According to the construction, by inserting the electromagnetic coil assembly into the annular groove, a clearance is formed between the electromagnetic coil assembly and the side walls which define the annular groove.

Consequently, even if the coefficients of linear expansion of the electromagnetic coil assembly, and the core and the armature are different, mutual interferences resulting in conjunction with a change in temperature can be avoided, and, hence, a construction can be realized in which the electromagnetic coil assembly is free from stress.

According to a thirteenth aspect of the present invention as set forth in the second aspect of the present invention, the main coil of the electromagnetic coil assembly is a stepped coil having a small diameter portion and a large diameter portion. The electromagnetic coil assembly further has a search coil attached to the small diameter portion.

Therefore, a search coil can be mounted on the small diameter portion of the main coil, thereby making it possible to provide the electromagnetic actuator having the electromagnetic coil assembly which is compact and is highly reliable.

According to a fourteenth aspect of the present invention as set forth in the second aspect of the present invention, a terminal of the main coil and a terminal of the search coil are disposed so as to be spaced away from each other through 90 degrees.

According to a fifteenth aspect of the present invention as set forth in the second aspect of the present invention, a terminal of the main coil and a terminal of the search coil are disposed so as to be spaced away from each other through 180 degrees.

DETAILED DESCRIPTION OF THE PREFERRED EMBODIMENT

Figure 1:
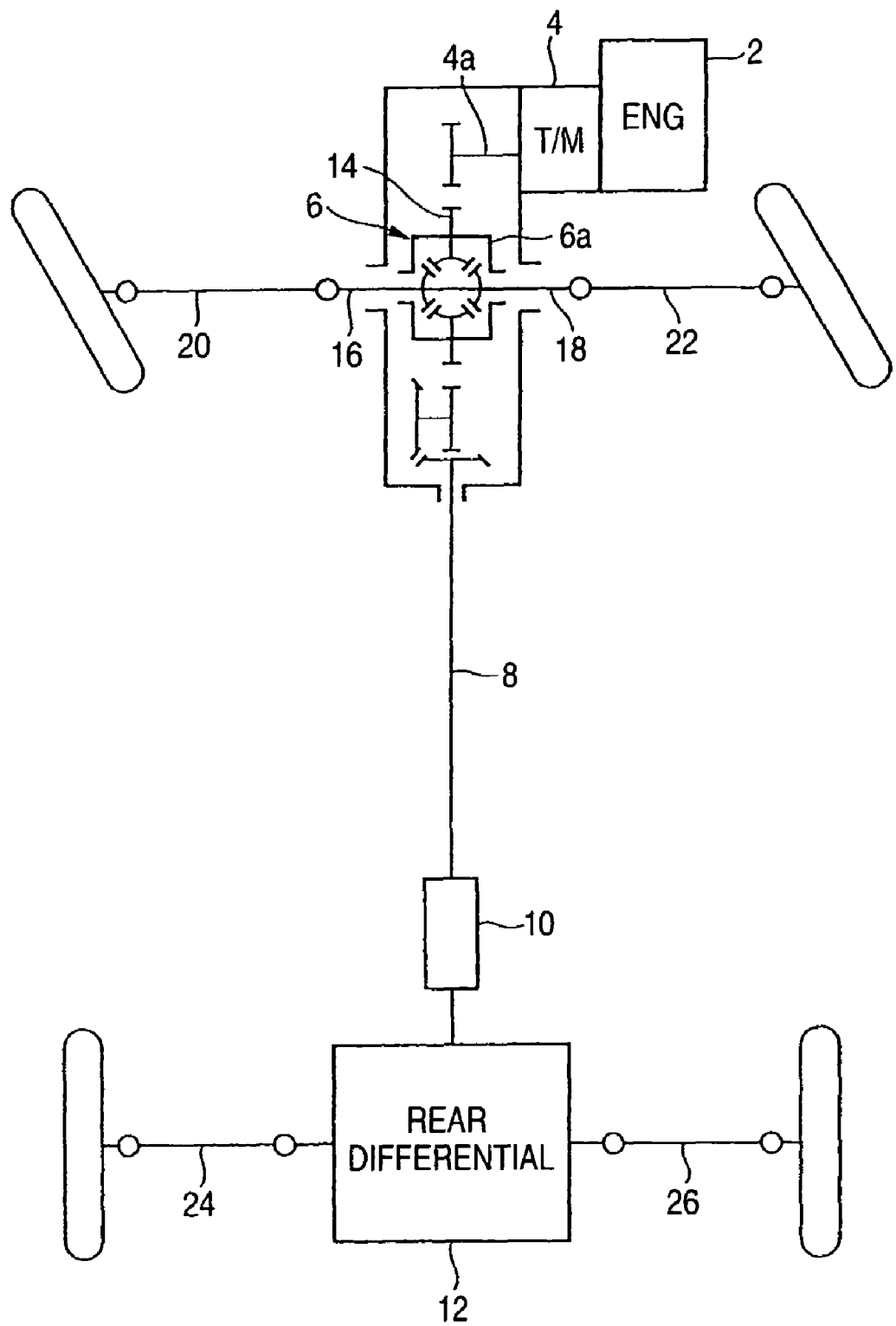
FIG. 1 is a schematic diagram showing a drive train of a four-wheel drive vehicle.

Referring to FIG. 1, a schematic diagram is shown which depicts a drive train system of a four-wheel drive vehicle designed based on a front-engine, front-wheel drive (FF) vehicle to which an electromagnetic coil assembly and an electromagnetic actuator both according to the invention can be applied.

As shown in FIG. 1, the drive train system mainly includes a front deferential 6 to which a power of an engine 2 disposed at a front of a vehicle is transmitted from an output shaft 4a of a transmission 4, a speed increasing device (a change-speed gear system) 10 to which the power from the front differential 6 is transmitted to a drive shaft 8 and a rear differential 12 to which the power from the speed increasing device 10 is transmitted.

The front differential 6 has a conventional known structure, in which the power from the output shaft 4a of the transmission 4 is transmitted to left and right front drive shafts 20, 22 by way of a plurality of gears 14 accommodated in a differential case 6a and output shafts 16, 18, whereby respective front wheels are driven.

As will be described later on, the rear differential 12 incorporates a pair of planetary gear sets and a pair electromagnetic actuators each for controlling the engagement of a multi-plate brake mechanism, and the power is transmitted to left and right rear drive shafts 24, 26 by controlling the electromagnetic actuators, whereby respective rear wheels are driven.

Figure 2:
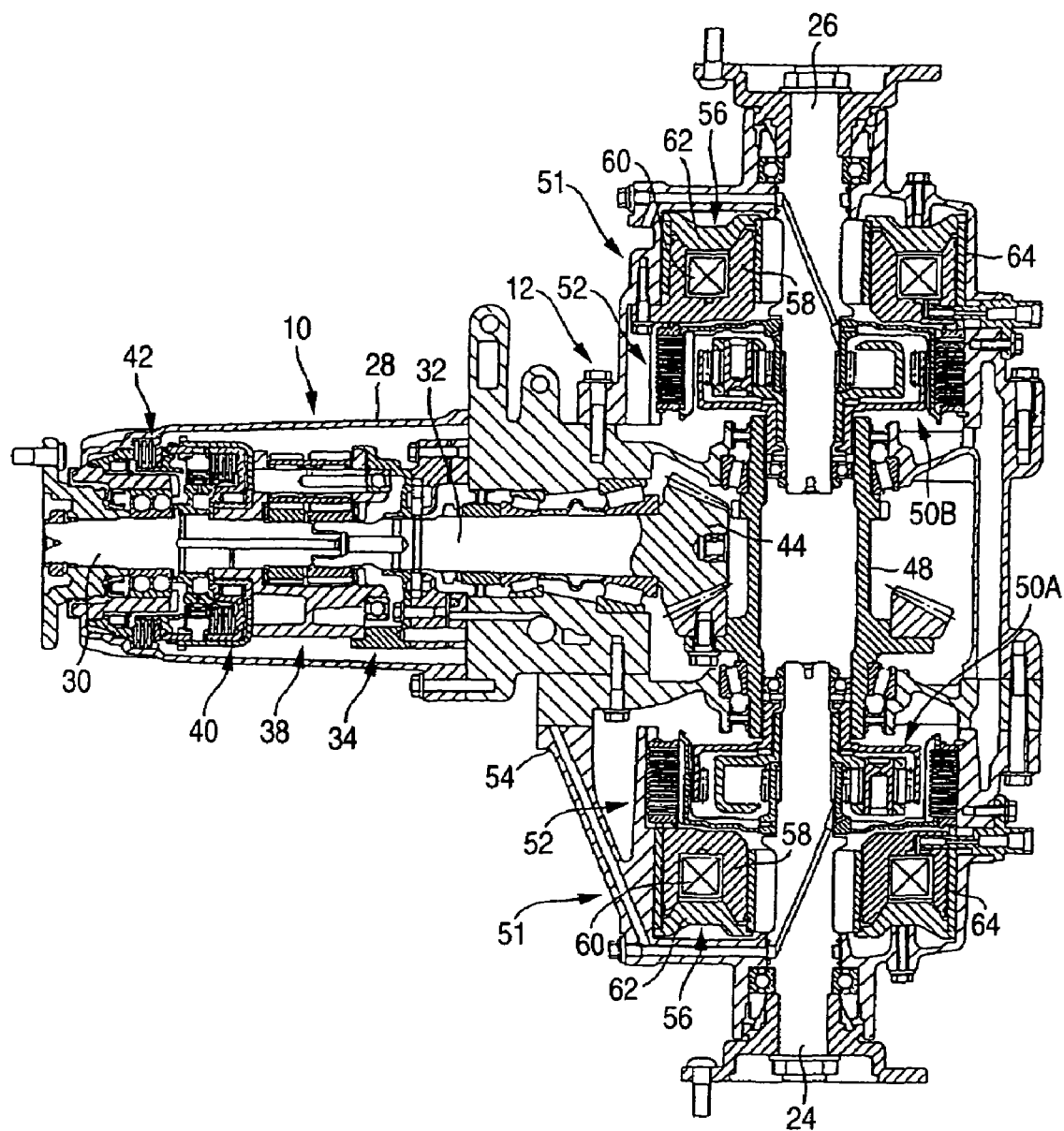
FIG. 2 is a cross-sectional view of a speed increasing device (a change-speed device) and a rear differential.

FIG. 2 shows cross-sectional views of the speed increasing device (the change-speed gear system) 10 and the rear differential 12 which is disposed on a downstream side of the speed increasing device 10. The speed increasing device 10 incorporates an input shaft 30 rotationally mounted within a casing 28 and an output shaft (hypoid pinion shaft) 32.

The speed increasing device 10 further incorporates an oil pump subassembly 34, a planetary carrier subassembly 38, a lock-up clutch subassembly 40 and a change-speed brake 42.

The rear differential 12 provided on the downstream side of the speed increasing device 10 has a hypoid pinion gear 44 formed on a distal end of the hypoid pinion shaft 32.

The hypoid pinion gear 44 is in mesh engagement with a hypoid ring gear 48, and the power from the hypoid ring gear 48 enters ring gears of a pair of left and right planetary gear sets 50A, 50B.

Sun gears of the planetary gear sets 50A, 50B are mounted so as to rotate around the left rear axle 24 and the right rear axle 26, respectively. Planetary carriers of the planetary gear sets 50A, 50B are fixed to the left rear axle 24 and the right rear axle 26, respectively. Planet gears carried on the planetary carrier are in mesh engagement with the sun gear and the ring gear.

The left and right planetary gear sets 50A, 50B are coupled, respectively, to brake mechanisms 51 provided for variably controlling the torque of the sun gears. The brake mechanism 51 incorporates a wet multi-plate brake 52 and an electromagnetic actuator 56 for actuating the multi-plate brake 52.

Brake plates of the wet multi-plate brake 52 are fixed to a casing 54, and brake discs thereof are fixed to the sun gears of the planetary gear sets 50A, 50B.

The electromagnetic actuator 56 includes a circular core (a yoke) 58 having an annular groove, an electromagnetic coil 60 inserted into the annular groove in the circular core 58, a circular armature 62 facing the circular core 58 with a predetermined gap being provided therebetween and an annular piston 64 coupled to the armature 62.

When a current is applied to the electromagnetic coil 60, the armature 62 is drawn towards the core 58 by the solenoid 60 to thereby generate a thrust. The piston 64 integrally coupled to the armature 62 then presses against the multi-plate brake 52, whereby a brake torque is generated.

This causes the sun gears of the planetary gear sets 50A, 50B to be fixed to the casing 54, respectively, and the drive force of the hypoid pinion shaft 32 is transmitted to the left and right rear axles 24, 26 via the ring gears, planet gears and planet carries of the planetary gear sets 50A, 50B.

By controlling the current conducted to the electromagnetic coil 60, the drive force of the input shaft 30 is increased in a locked-up state or by the speed increasing device 10 to be split as desired, thereby making it possible to realize an optimum turning control.

Next, referring to FIGS. 3A to 4B, a method for assembling an electromagnetic coil assembly 84 according to the present invention which can be adopted as the electromagnetic coil 60 shown in FIG. 2.

Figure 3A:
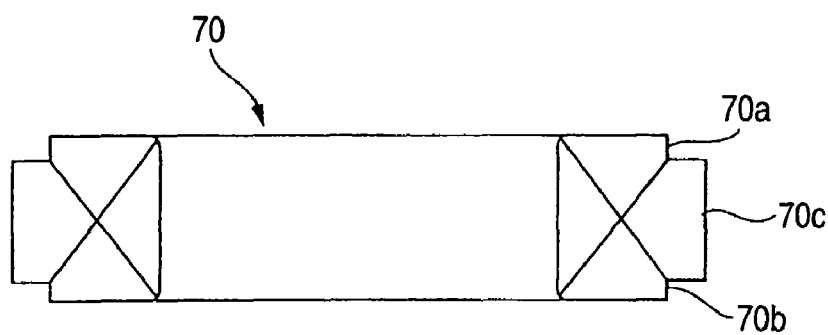
FIG. 3A shows a main coil 70.

FIG. 3A shows a main coil 70. Namely, the main coil 70 includes a winding without a bobbin in order to eliminate a risk that the tension of the winding is imparted to a coil bobbin.

The main coil 70 has small diameter portions 70a, 70b at ends thereof and an intermediate portion 70c having a large diameter. As will be described later on, a search coil and a coned disc spring are mounted on these small diameter portions 70a, 70b.

Figure 3B:
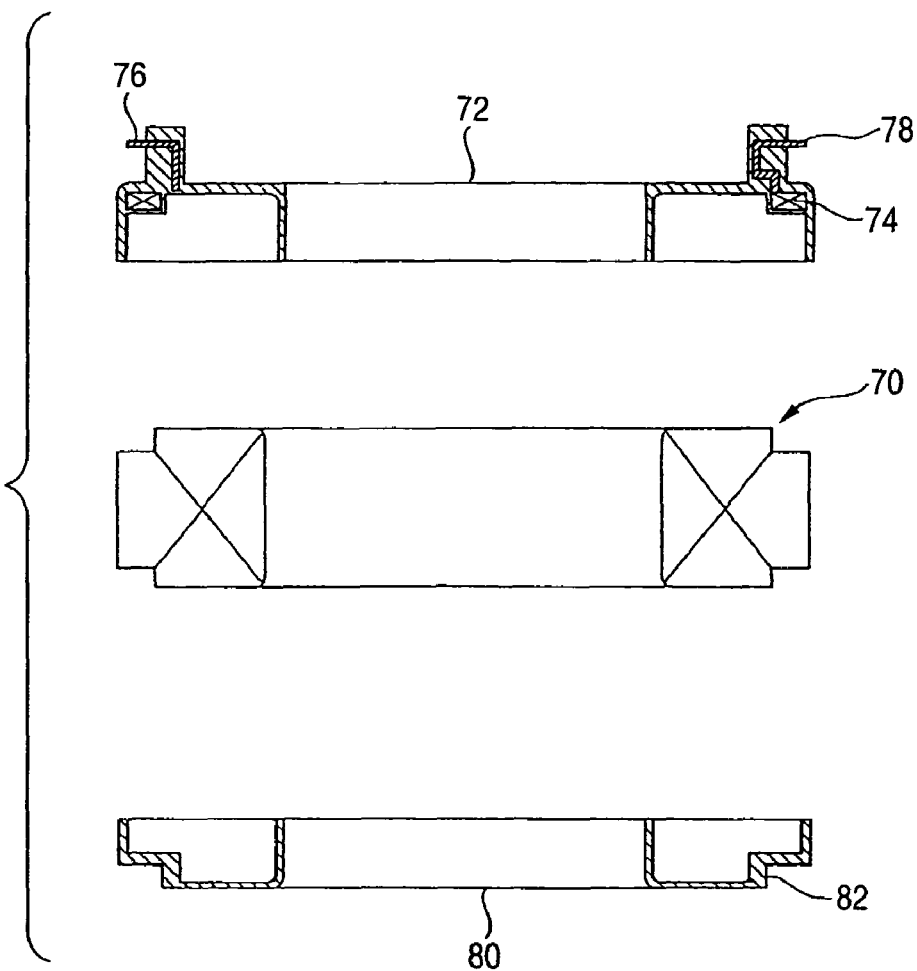
FIG. 3B is an explanatory diagrams explaining a method for assembling an electromagnetic coil assembly according to the present invention.
Figure 4A:
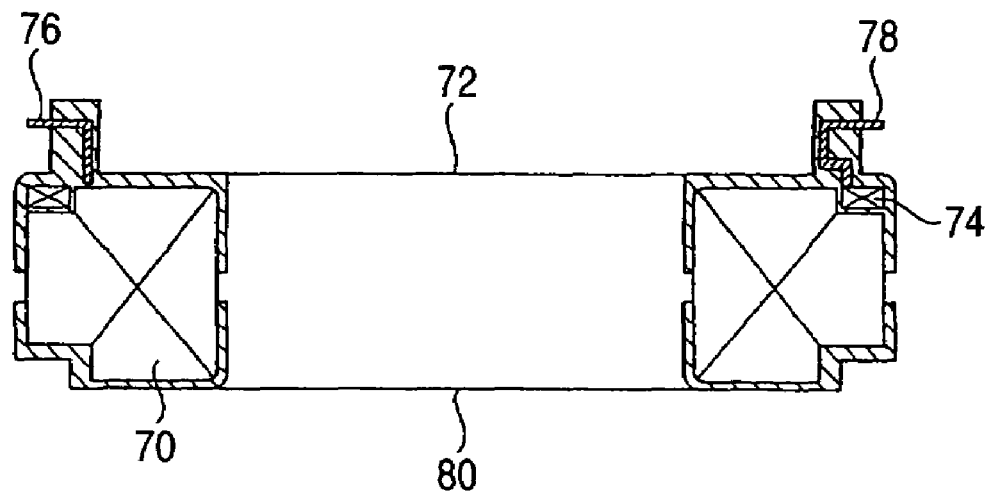
FIG. 4A shows a state that the first and second covers 72, 80 are temporarily held onto the main coil 70.
Figure 4B:
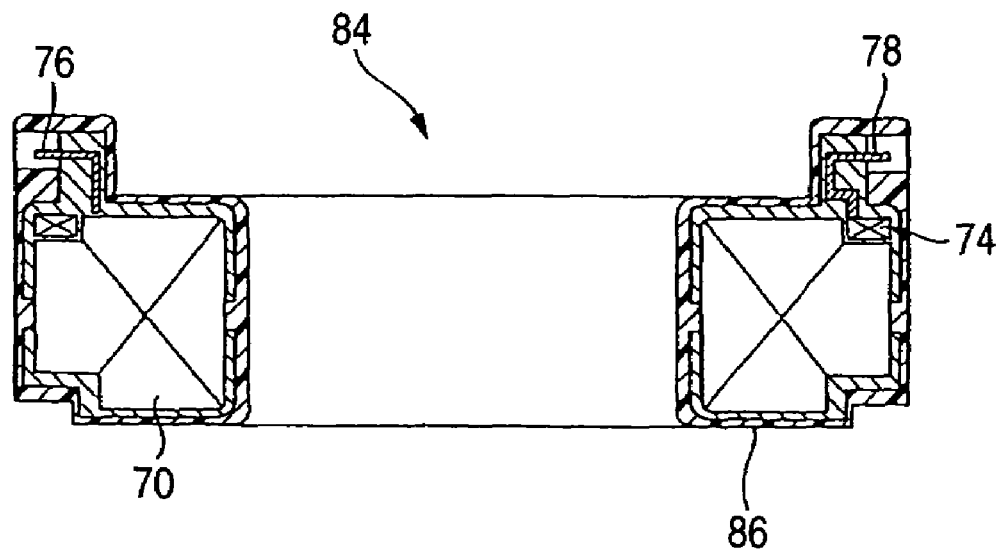
FIG. 4B is a state that the first and second covers 72, 80 are firmly fixed onto the main coil 70 with covering by a molding resin 86.

As shown in FIG. 3B, a first cover 72 is fitted over the main coil 70 from one end thereof, and a second cover 80 is fitted over the main coil 70 from the other end thereof, whereby the first and second covers 72, 80 are temporarily held onto the main coil 70 as shown in FIG. 4A.

The first cover 72 and the second cover 80 are both formed from an insulating material such as a resin. A search coil 74, a main coil terminal 76 and a search coil terminal 78 are mounted on the first cover 72. The second cover 80 has a step 82 which corresponds to the small diameter portion 70b of the main coil 70.

With the state shown in FIG. 4A, a molding resin 86 is allowed to cover all around the main coil 70 and the first and second covers 72 and 80 for fixation, whereby a configuration of where the covers are fitted over the main coil is formed while securing a positional accuracy at the terminal portions. The terminals 76, 78 are disposed outside the electromagnetic coil assembly 84 in consideration of easy connection with outside components.

Figure 5A:
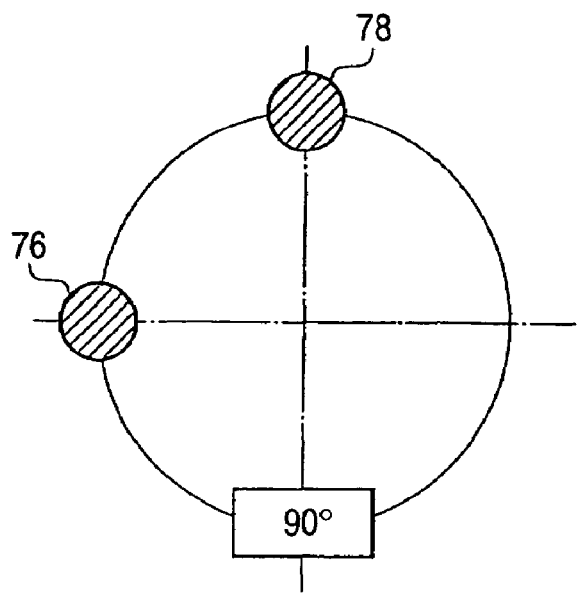
FIG. 5A shows that a main coil terminal 76 and a search coil terminal 78 are disposed so as to be spaced away from each other through 90 degrees.
Figure 5B:
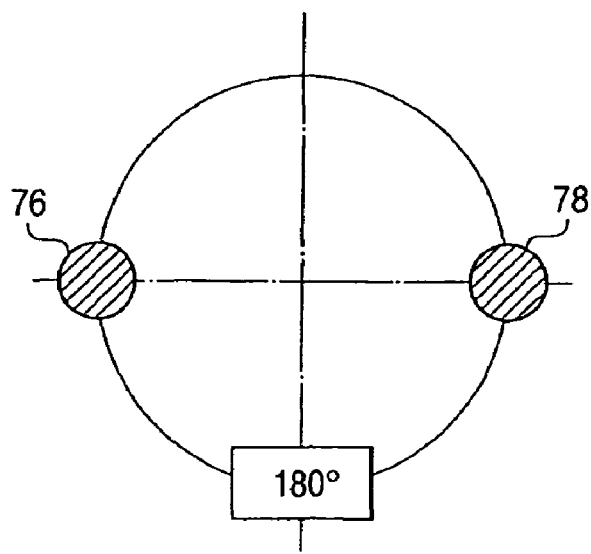
FIG. 5B shows that a main coil terminal 76 and a search coil terminal 78 are disposed so as to be spaced away from each other through 180 degrees.

A positional relationship between the terminal 76 for the main coil 70 and the terminal 78 for the search coil 74 is such that the terminals are disposed so as to be spaced away from each other through 90 degrees as shown in FIG. 5A, or through 180 degrees as shown in FIG. 5B.

Figure 6:
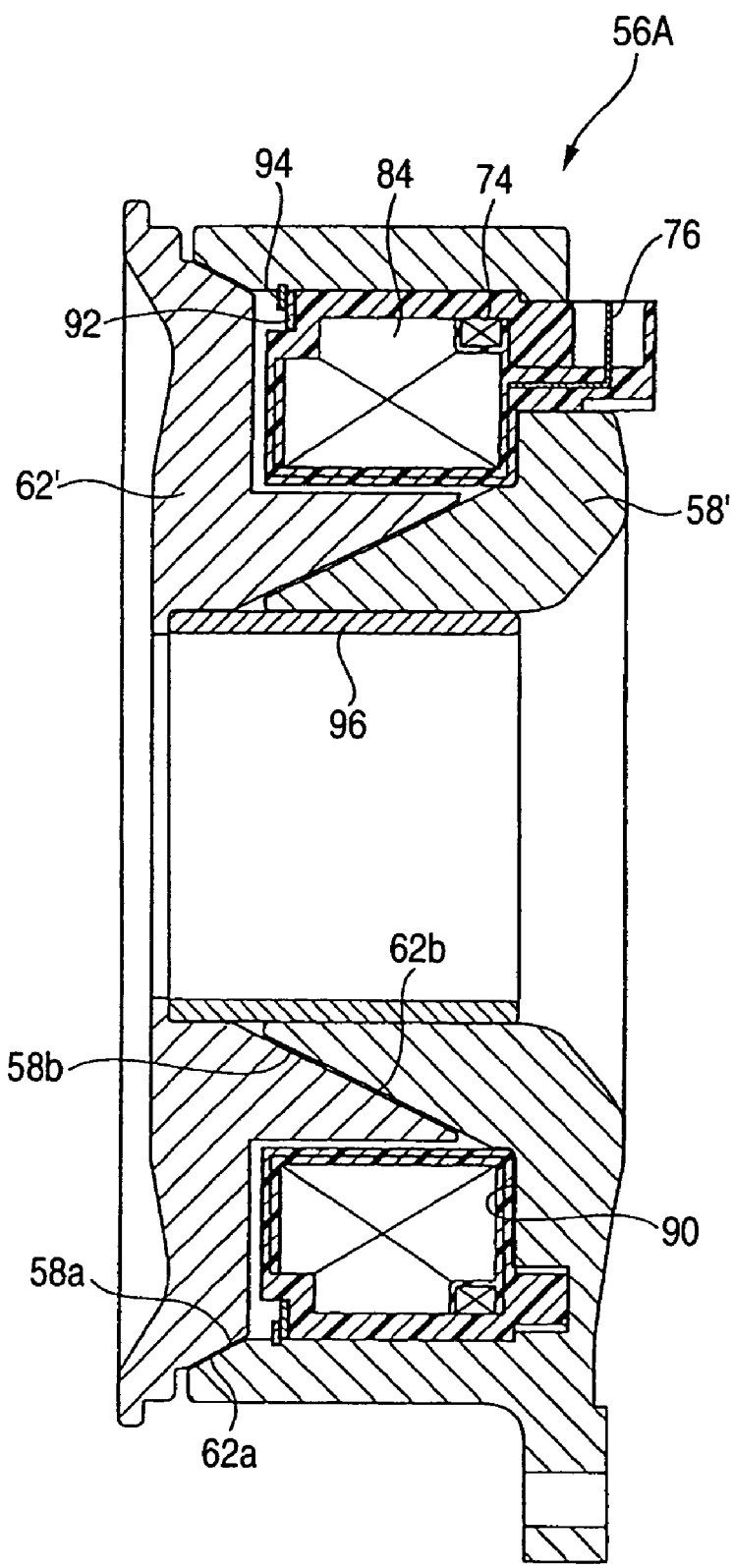
FIG. 6 is a cross-sectional view of an electromagnetic actuator according to a first embodiment of the present invention.

Referring to FIG. 6, a cross-sectional view of an electromagnetic actuator 56A according to the first aspect of the present invention is shown. The electromagnetic actuator 56A has a circular core (a Yoke) 58' having an annular groove 90. The electromagnetic coil assembly 84 is inserted into the annular groove 90 in the circular core 58'.

The circular core 58' has a first outer circumferential side tapered end face 58a which is formed radially outwardly of the annular groove 90 and which inclines at a first angle relative to a central axis of the circular core 58' and a first inner circumferential side tapered end face 58b which is formed radially inwardly of the annular groove 90 and which inclines at a second angle relative to the central axis of the circular core 58'.

The electromagnetic armature 56A further has a circular armature 62' which faces the circular core 58' with a predetermined gap being provided therebetween and a cylindrical slider 96 fixed to the armature 62'. The cylindrical slider 96 guides the armature 62' when it moves along a shaft such as the rear axles 24, 26.

The circular armature 62' has a second outer circumferential side tapered end face 62a which is shaped complementarily to the first outer circumferential tapered end face 58a and a second inner circumferential side tapered end face 62b which is shaped complementarily to the first inner circumferential tapered end face 58b.

Reference numeral 92 denotes a coned disc spring for biasing the electromagnetic coil assembly 84 in an axial direction, and the electromagnetic coil assembly 84 and the coned disc spring 92 are locked by a circlip 94.

Figure 7A:
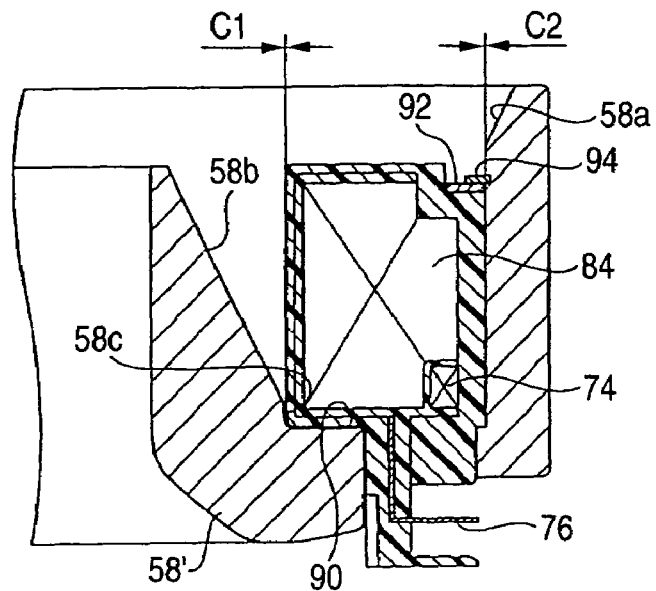
FIG. 7A is a cross-sectional view showing radial clearances between an electromagnetic coil assembly and a circular core of the electromagnetic actuator according to the first embodiment.

As shown in FIG. 7A, the electromagnetic coil assembly 84 is mounted in the annular groove 90 with a radial clearance being provided so that the electromagnetic coil assembly 84 does not interfere with the circular core 58'.

Namely, the electromagnetic coil assembly 84 dimensioned relative to the circular core 58' such that a clearance C1 is provided between a shoulder 58c of the circular core 58' and an inner circumference of the electromagnetic coil assembly 84, and that a clearance C2 is provided between an outer circumference of the electromagnetic coil assembly 84 and the circular core 58'. The clearance C1 is, for example, on the order of 0.3 mm, and the clearance C2 is, for example, on the order of 0.1 mm.

Figure 7B:
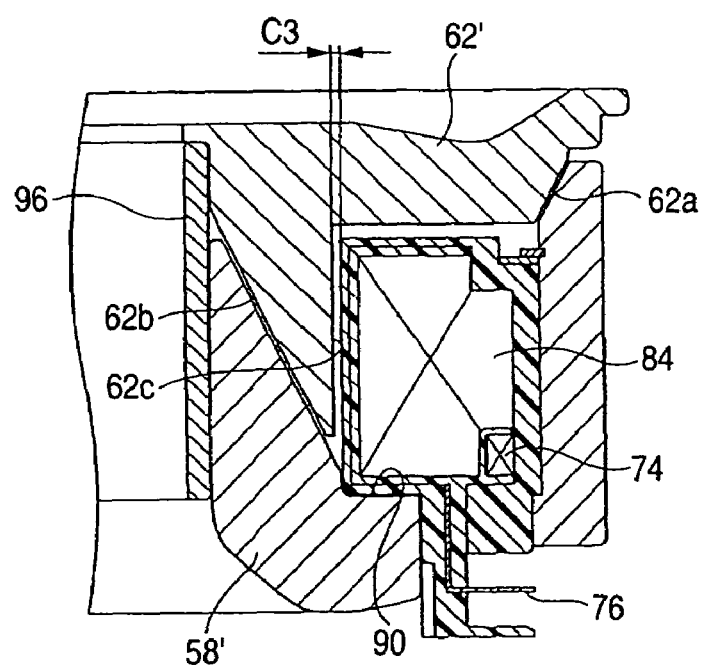
FIG. 7B is a cross-sectional view showing a radial clearance between the electromagnetic coil assembly and a circular armature.

Furthermore, as shown in FIG. 7B, the electromagnetic coil assembly 84 is dimensioned relative to the circular armature 62' such that a clearance C3 is provided between the inner circumference of the electromagnetic coil assembly 84 and the circular armature 62'. The clearance C3 is, for example, on the order of 0.8 mm.

Thus, the electromagnetic coil assembly 84 is dimensioned relative to the circular core 58' and the circular armature 62' such that the radial clearances are provided between the electromagnetic coil assembly 84 and the circular core 58' and the circular armature 62'.

Consequently, even if the coefficients of linear expansion of the electromagnetic coil assembly 84, the core 58' and the armature 62' which are formed from a magnetic material differ, mutual interferences that would be caused therebetween due to a change in temperature can thus be avoided, and it is possible to provide a structure where the electromagnetic coil assembly 84 is free from stress.

As best shown in FIG. 3A, since the main coil 70 according to the embodiment is wound in the stepped fashion so as to have the small diameter portions 70a, 70b, the search coil 74 and the coned disc spring 92 can be mounted on these small diameter portions 70a, 70b, whereby the space can be used effectively.

Furthermore, the circlip 94 and the coned disc spring 92 can be disposed at the molding resin portion which does not overlap the main coil 70 in the radial direction, whereby a load of the coned disc spring 92 can be absorbed by the molding resin, thereby making it possible to prevent the application of stress to the main coil 70 by the coned disc spring 90.

Figure 8:
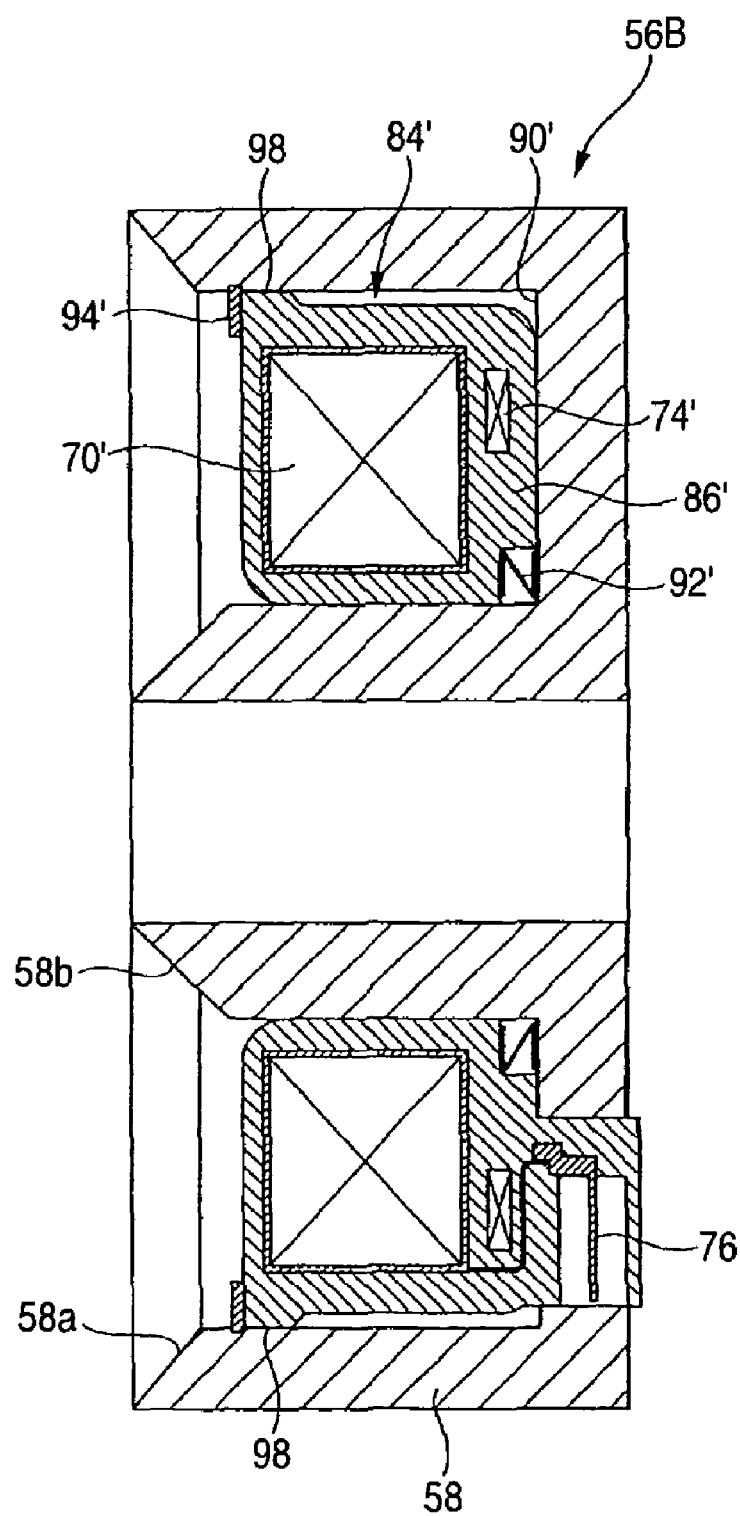
FIG. 8 is a cross-sectional view of an electromagnetic actuator according to a second embodiment of the present invention and FIG. 9 is a front view of a molding resin used for the electromagnetic coil assembly of the electromagnetic actuator according to the second embodiment.

FIG. 8 is a perspective view of an electromagnetic actuator 56B according to a second embodiment of the present invention. An electromagnetic coil assembly 84' has a main coil 70' and a search coil 74' which is embedded in a molding resin 86'.

Figure 9:
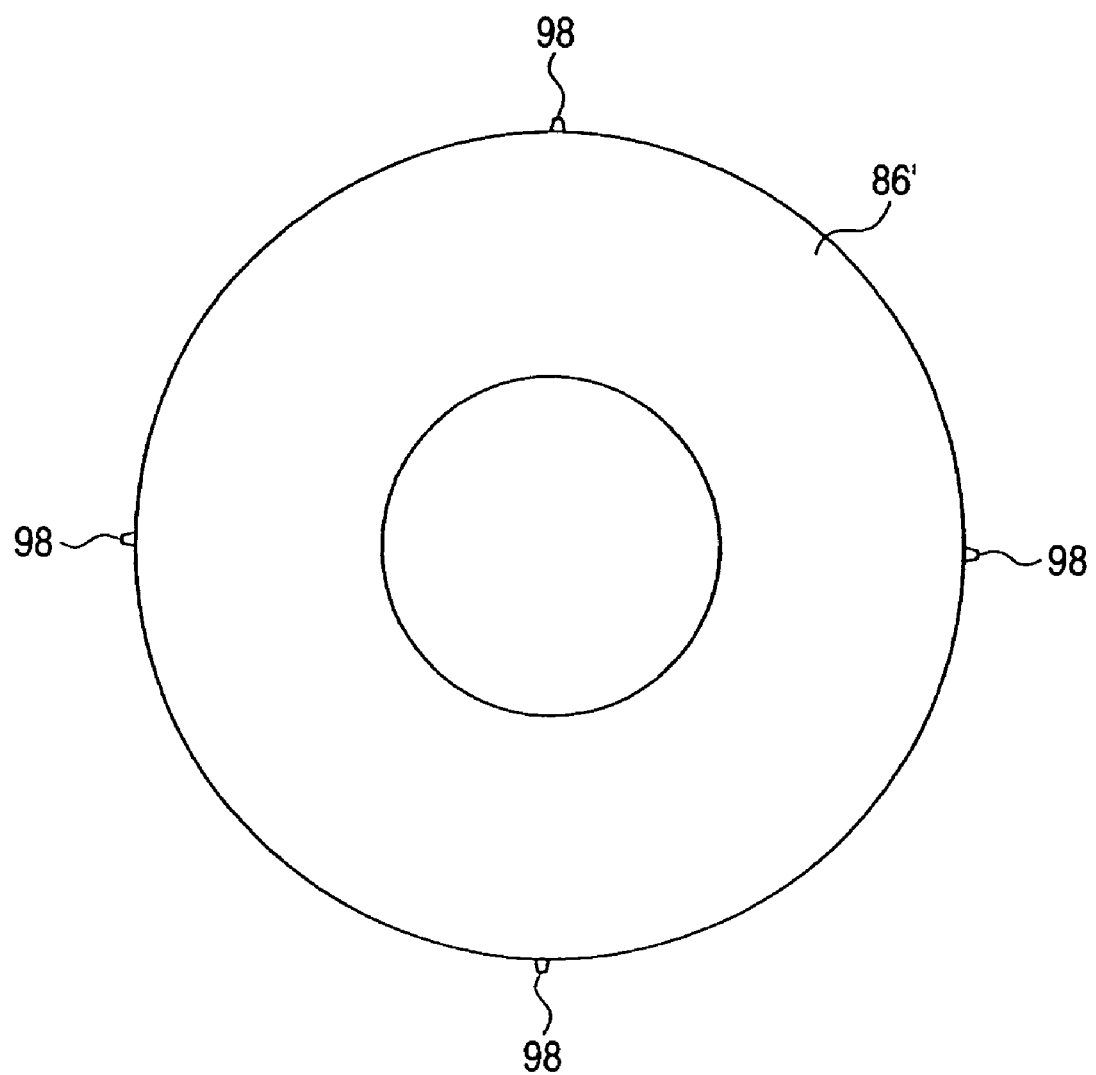

Furthermore, as shown in FIG. 9, the molding resin 86' has a plurality of projections 98 which are spaced apart from each other in a circumferential direction, and a radial clearance between an outer circumference and the electromagnetic coil assembly 84' and a circular core 58 can be secured by these projections 98.

In this embodiment, a coned disc spring 92 is placed in a bottom portion of an annular groove 90', and the dislocation of the electromagnetic coil assembly 84' from the annular groove 90' is prevented by a circlip 94.

Vibrations in a thrust direction are dealt with by the coned disc spring 92 and the circlip 94, and vibrations in a radial direction by the projections 98. In addition, the projections 98 can be formed easily by the molding resin.

The projections 98 can be disposed at the molding resin portion which does not overlap the main coil 70 in an axial direction and the projections 98 can be disposed at positions where radial mutual interferences by a change in temperature caused by a difference in coefficients of the linear expansion of the core 58 and the electromagnetic coil assembly 84' formed from magnetic material are not transmitted to the main coil 70.

According to the first aspect of the invention, since the main coil is the coil without a bobbin, the tension load resulting when the wire is wound remains in the main coil in no case. Consequently, it is possible to provide the electromagnetic coil assembly which is difficult to be affected by the stress resulting in conjunction with a change in temperature.

According to the second aspect of the invention, the electromagnetic coil assembly having the main coil is mounted in the annular groove in the circular core. Consequently, in no case the tension load resulting when the wire is wound remains in the main coil, and therefore, it is possible to provide the electromagnetic actuator which is difficult to be affected by the stress generated in conjunction with a change in temperature and, hence, which is highly reliable.

According to the third aspect of the invention, a magnetic field that is generated by the main coil can be detected by the search coil, and the value of a current that is conducted through the main coil can be controlled based on the magnetic field so detected.

According to the fourth and fifth aspects of the invention, even if the coefficients of linear expansion of the electromagnetic coil assembly, and the core and the armature are different, the mutual interferences resulting in conjunction with a change in temperature can be avoided, and, hence, the construction can be realized in which the electromagnetic coil assembly is free from stress.

According to the sixth through eighth aspects of the invention, the electromagnetic coil assembly can be securely locked within the annular groove with a certain magnitude of elastic force being provided.

According to the ninth through twelfth aspects of the invention, the clearance can be formed between the electromagnetic coil assembly and the side walls which define the annular groove, and even if the coefficients of linear expansion of the electromagnetic coil assembly, and the core and the armature are different, the mutual interferences resulting in conjunction with a change in temperature can be avoided, and, hence, the construction can be realized in which the electromagnetic coil assembly is free from stress.

According to the thirteenth aspect of the invention, the search coil can be mounted on the small diameter portion of the main coil, thereby making it possible to provide the electromagnetic actuator having the electromagnetic coil assembly which is compact and is highly reliable.

What is claimed is:

1. An electromagnetic actuator comprising:
    a circular core having an annular groove;
    an electromagnetic coil assembly mounted in the annular groove; and
    a circular armature disposed so as to be opposed to the circular core with a gap being provided therebetween, wherein the electromagnetic coil assembly comprises:
        a main coil having a first end and a second end, the main coil being wound without a bobbin;
        a first cover fitted over the main coil from the first end of the main coil;
        a second cover fitted over the main coil from the second end of the main coil; and
        a molding resin covering the first and second covers.

2. An electromagnetic actuator as set forth in claim 1, wherein the electromagnetic coil assembly further comprises a search coil embedded in the molding resin.

3. An electromagnetic actuator as set forth in claim 1, wherein the electromagnetic coil assembly is mounted in the annular groove with a clearance in a radial direction.

4. An electromagnetic actuator as set forth in claim 2, wherein the electromagnetic coil assembly is mounted in the annular groove with a clearance in a radial direction.

5. An electromagnetic actuator as set forth in claim 1, further comprising:
    a biasing unit for biasing the electromagnetic coil assembly in an axial direction; and
    a clip for preventing the electromagnetic coil assembly from being dislocated the annular groove.

6. An electromagnetic actuator as set forth in claim 2, further comprising:
    a biasing unit for biasing the electromagnetic coil assembly in an axial direction; and
    a clip for preventing the electromagnetic coil assembly from being dislocated the annular groove.

7. An electromagnetic actuator as set forth in claim 3, further comprising:
    a biasing unit for biasing the electromagnetic coil assembly in an axial direction; and
    a clip for preventing the electromagnetic coil assembly from being dislocated the annular groove.

8. An electromagnetic actuator as set forth in claim 1, wherein the molding resin has a plurality of projections spaced away from each other in a circumferential direction, and wherein the electromagnetic coil assembly is inserted into the annular groove in such a manner that the projections are brought into abutment with sidewall constituting the annular groove.

9. An electromagnetic actuator as set forth in claim 2, wherein the molding resin has a plurality of projections spaced away from each other in a circumferential direction, and wherein the electromagnetic coil assembly is inserted into the annular groove in such a manner that the projections are brought into abutment with sidewall constituting the annular groove.

10. An electromagnetic actuator as set forth in claim 3, wherein the molding resin has a plurality of projections spaced away from each other in a circumferential direction, and wherein the electromagnetic coil assembly is inserted into the annular groove in such a manner that the projections are brought into abutment with sidewall constituting the annular groove.

11. An electromagnetic actuator as set forth in claim 4, wherein the molding resin has a plurality of projections spaced away from each other in a circumferential direction, and wherein the electromagnetic coil assembly is inserted into the annular groove in such a manner that the projections are brought into abutment with sidewall constituting the annular groove.

12. An electromagnetic actuator as set forth in claim 1, wherein the main coil of the electromagnetic coil assembly is a stepped coil having a small diameter portion and a large diameter portion, and wherein electromagnetic coil assembly further comprises a search coil attached to the small diameter portion.

13. An electromagnetic actuator as set forth in claim 1, wherein a terminal of the main coil and a terminal of the search coil are disposed so as to be spaced away from each other through 90 degrees.

14. An electromagnetic actuator as set forth in claim 1, wherein a terminal of the main coil and a terminal of the search coil are disposed so as to be spaced away from each other through 180 degrees.

* * * * *